United States Patent [19]

Trian

[11] Patent Number: 5,117,138
[45] Date of Patent: May 26, 1992

[54] STATOR FOR AN ELECTRIC MOTOR AND MOTOR EQUIPPED THEREWITH

[75] Inventor: Herve Trian, Parne sur Roc, France

[73] Assignee: Pompes Salmson, Rueil Malmaison, France

[21] Appl. No.: 762,165

[22] Filed: Sep. 19, 1991

Related U.S. Application Data

[63] Continuation of Ser. No. 563,378, Aug. 6, 1990, abandoned.

[30] Foreign Application Priority Data

Aug. 11, 1989 [FR] France ............... 89 10809

[51] Int. Cl.⁵ .................................... H02K 5/00
[52] U.S. Cl. ........................... 310/89; 310/87; 417/360
[58] Field of Search ............ 310/89, 90, 209, 254, 310/257, 263, 85, 86, 87; 417/321, 360, 902

[56] References Cited

U.S. PATENT DOCUMENTS

| 2,385,385 | 9/1945 | Sigmund et al. | 171/252 |
|---|---|---|---|
| 3,138,105 | 6/1964 | White | 310/86 |
| 3,225,698 | 12/1965 | Spisiak | 310/90 |
| 3,333,544 | 8/1967 | Turk et al. | 103/87 |
| 3,638,055 | 1/1972 | Zimmermann | 310/43 |
| 4,716,648 | 1/1988 | Nel | 29/596 |
| 4,955,128 | 9/1990 | Sogabe et al. | 29/596 |

FOREIGN PATENT DOCUMENTS

| 612714 | 4/1935 | Fed. Rep. of Germany . |
|---|---|---|
| 1097543 | 1/1961 | Fed. Rep. of Germany . |
| 1488506 | 8/1969 | Fed. Rep. of Germany . |
| 1935929 | 1/1971 | Fed. Rep. of Germany . |
| 2744856 | 4/1979 | Fed. Rep. of Germany . |
| 2751516 | 5/1979 | Fed. Rep. of Germany . |
| 806908 | 12/1936 | France . |
| 1163937 | 10/1958 | France . |
| 1271861 | 8/1961 | France . |
| 2207378 | 6/1974 | France . |

*Primary Examiner*—Steven L. Stephan
*Assistant Examiner*—Ed To
*Attorney, Agent, or Firm*—Pennie & Edmonds

[57] ABSTRACT

A stator for an electric induction motor includes a packet of stacked laminations with slots housing the substantially rectilinear parts of the winding turns and in which the end winding parts are encapsulated at each of the stator in an insulating housing structure that is respectively closed at the end of the stator laminations close to the air gap and at the outside of the yoke of the stator magnetic circuit, one of the said insulating housings being open over the whole air gap section in order to receive the rotor and being flanged onto one of the rotor supports while the other of said housing structures includes an abutment flange supporting the stator against a rotor bearing, the stator being employed in motors in which the rotor is held in position by an air gap tube and where the stator can be introduced in a removable manner onto a rotor subassembly.

5 Claims, 1 Drawing Sheet

1

STATOR FOR AN ELECTRIC MOTOR AND MOTOR EQUIPPED THEREWITH

This is a continuation of application Ser. No. 07/563,378, filed Aug. 6, 1990, now abandoned.

BACKGROUND OF THE INVENTION

The present invention relates to an electric induction motor stator encapsulated in an insulating envelope or housing closed at the magnetic circuit yoke and at the winding turns right up to the end portion of the laminations at the entrance to the air gap and open over the whole of the cross-section of the air gap in order to receive the rotor which is housed in a rotor tube. It also relates to induction motors that are fitted with such a stator.

Induction motors are by far the electric motors that are the simplest to construct and have the best yield when they run continuously under normal speed conditions, in other words not too far from their speed of synchronism with the frequency of their electrical supply network. The magnetic circuit of the stator is generally made up by a stack of laminations cut out from the same initial lamination material in order to constitute a complete motor the rotor of which is in principle able to withstand any overheating condition since its squirrel-cage electrical circuit is currently formed from copper or aluminum bars that are directly in contact with the noninsulated laminations of the rotor. The stator circuit which has to withstand the electrical supply voltage on several mutually insulated windings is, on the other hand, much more fragile and needs a lot more space because it surrounds the rotor in the majority of applications and the problem of replacing it occurs much more frequency than is the case for the rotor which is subject rather to problems involving its bearings.

The present invention sets out to provide a stator for an induction motor which can be readily replaced independently of its rotor, the latter generally being linked to a driven rotating component which, in equipment such as pumps, can be completely isolated from the stator by an environment-tight wall. The stator in accordance with the invention requires, because of its dismountable nature, to be light, easy and inexpensive to manufacture while at the same time having exceptional qualities as regards its compactness, electrical insulation and environmental sealing properties.

SUMMARY OF THE INVENTION

This aim is achieved, in accordance with the invention, by the fact that the stator magnetic circuit is covered with a molded-over insulating layer that includes at each of the stator end faces two crown regions in the form of sleeve portions that are concentric with the air gap and surround the end winding parts or overhang and wherein an insulating end cover is externally or internally fitted onto said sleeve portions in order to encapsulate the said end winding parts, in cooperation with said sleeve portion, in an insulating housing structure, whereby the complete stator constitutes a unit that is readily replaceable and/or rotationally orientable with respect to the rotor. The electric motor in accordance with the invention should no longer be considered as a unit comprising a rotor placed inside a stator housed in a casing or housing but rather as the assembly, as a function of requirements and at desired special positions, of a stator employed to drive a rotor that is already in place and thus dismountable only with difficulty, (and replaced only where there is damage to the rotating mechanical component that is rotatively driven by the rotor).

In accordance with another embodiment, the rear insulating end cover includes an abutment flange for supporting the stator against the rear bearing of the rotor and at least one of said sleeve portions or one of said end covers has provision for passage therethrough of the wires connecting the windings of the motor to an external source of electrical power. The rear end housing thus constitutes the closing flange of the motor yoke ring on the rear bearing of the rotor and which is carried on the rotor when the stator is being assembled onto the rotor.

In accordance with a further embodiment providing an even more compact structure, at least one of the end insulating sleeve portions is joined to an insulating yoke ring externally surrounding the magnetic circuit yoke and carrying a terminal box for connection to the electrical supply network and/or an electric motor regulating circuit.

The invention also relates to an electric motor-driven pump unit including a stator of the above described type and an electric motor rotor sealingly mounted in canti-levered fashion inside an air gap tube or sleeve on a pump rotor housing including a front bearing that is common to the rotor of said electric motor and the rotor of the pump. In such a motor-driven pump assembly, according to the invention the stator is inserted over the air gap tube in a removable manner while coming to fit, via the first insulating end cover, against the pump rotor housing while the second insulating end cover comes into abutment with a rear rotor bearing support that is integral with the air gap tube. The second insulating end cover comes into abutment with said rear bearing support via the intermediary of an annular sealing gasket while the first insulating end cover is flanged in a sealing manner onto the pump rotor housing whereby the stator circuit is separated from the outside.

In accordance with another embodiment of the invention, a removable plug or closing member of the rear chamber of the electric motor shaft joined to the pump fluid circulation circuit is screwed onto said rear bearing support and comes into sealed abutment with said annular sealing gasket acting as a sealed support surface for said second insulating end cover on said bearing support. The outermost sleeve portion of the first said end insulating housing structure is frictionally engaged with an annular elastomer layer provided inside a retaining ring integral with said pump body whereby a sealed joint is established at the front side of said pump body and said stator which, prior to its engagement onto said pump body can be freely rotationally oriented, is frictionally maintained in position.

BRIEF DESCRIPTION OF THE DRAWINGS

Other aims, advantages and characteristics of the invention will become more clear from the following description of an embodiment of the invention, given by way of non-limited illustration with reference to the attached drawings in which.

DETAILED DESCRIPTION OF PREFERRED EMBODIMENTS

Figure 1:
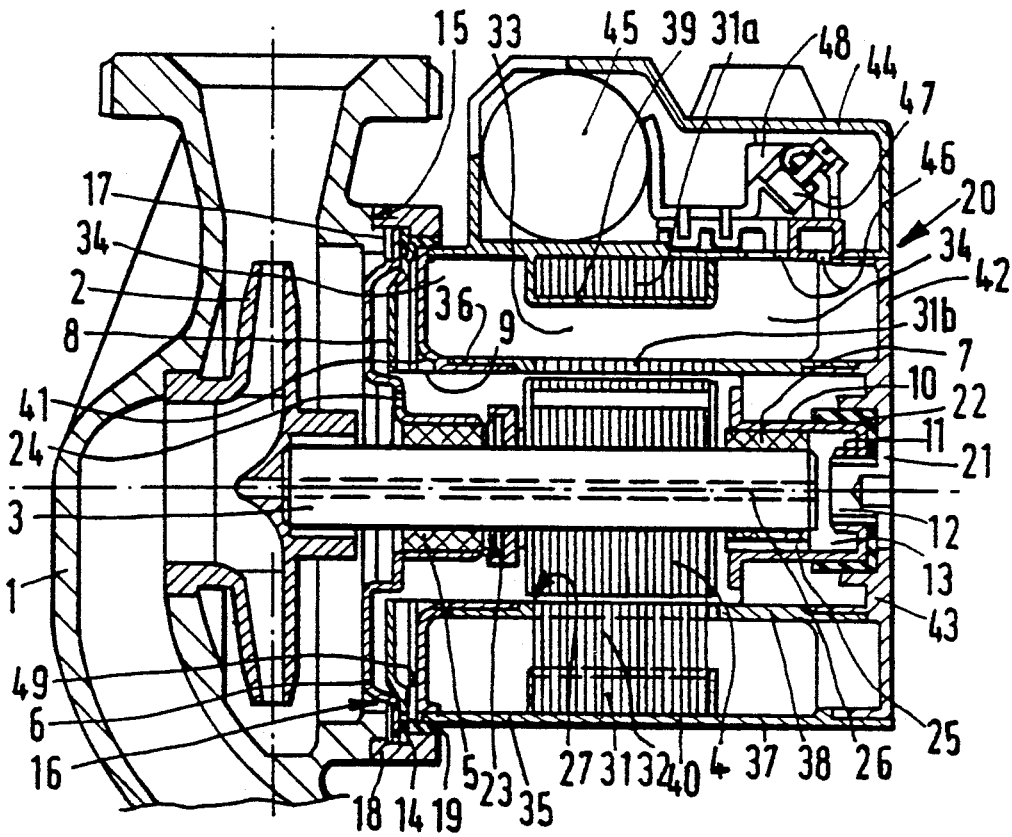
FIG. 1 is a longitudinal cross-section of an electric motor according to the invention applied to an electrically-driven pump assembly with an air gap tube.

FIG. 1 shows a pump body or outer casing 1 in which a pump rotor 2 is housed, the rotor being integral with a shaft 3 that is common to the pump rotor 2 and the electric motor rotor 4. The shaft 3 is here supported by two graphite friction bearings: a forward bearing 5 carried by a front end flange 6 made of stainless steel sheet and a rear bearing 7. The front end flange 6, which has to withstand the pressure of the fluid transported by the pump has a double-walled structure with an outer annular plate 8 integral with a thin air gap tube 9 in a non-magnetic material, for example stainless steel. The air gap tube or sleeve 9 is closed off and joins up at the back on a thicker sleeve member 10 carrying the rear bearing 7 and having an internally threaded inner shoulder portion 11 for receiving a plug or closing member 12 of a shaft chamber 13 that is linked to the inlet side of the pump for the return of fluid circulating through the bearings and the air gap.

The front end flange 6 and the annular plate 8 are assembled together tightly in a sealed manner, with an annular sealing gasket 14 arranged therebetween, on an open side 15 of the pump body 1 in order to close off the large opening 16 in this side 15. The front end flange 6 is mounted by fitting a flat annular sealing gasket 17 between a corresponding flat surface of side 15 and the flat outer edge portion of this end plate while the annular plate 8 is kept captive by a retaining ring 18 that is secured onto side 15 by any suitable means, for example screws which are not shown, in order to apply the outer edge of the front end flange 6 against the flat annular gasket 17. In accordance with an arrangement that is particular to the present invention, the retaining ring 18 is provided on its front internal face directed towards the stator 20 with an elastomer layer 19 that adheres very strongly to the material of ring 18. The plug or closing member 12 that is screwed into the internal shoulder portion 11 of sleeve 10 comes to abut in a sealed manner against an elastomer cover member 22 via an annular lip or flange 21.

An axial bearing end stop 23 is inserted between the rotor 4 of the electric motor and the forward bearing 5, the assembly of the pump rotor 2 and the rotor 4 being normally pushed into abutment with the forward bearing 5 by the axial thrust of the pump rotor 2. A fluid circulation path is set up between the higher pressure side of the pump and the shaft chamber 13 via a passage 24 provided in the end flange 6, the annular air gap passage between the rotor 4 and the air gap tube 9 and peripheral passages 25 between the rear bearing 7 and the sleeve member 10. The fluid that is thus introduced into the shaft chamber 13 returns to the inlet side of the pump via a central passage 26 provided in the shaft 3 and the rotor 2.

Figure 2:
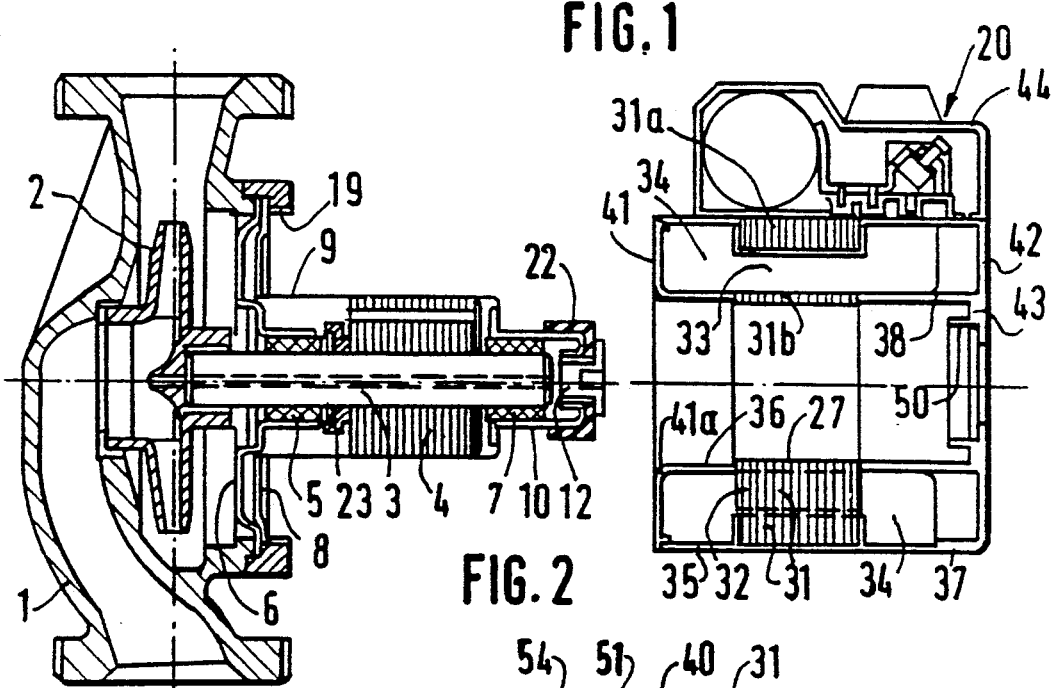
FIG. 2 shows, also in longitudinal cross-section and on a smaller scale, the motor-driven pump assembly of FIG. 1 at the moment of separation of the stator and the rotor of the electric motor.

The whole of the pump and rotor casing or body that appears in the left hand part of FIG. 2 is sealed and mechanically stable as the bearings 5 and 7 of the rotor are respectively carried by the front end flange 6 and by the air gap tube 9 joined to the annular plate 8, the two components of the end flange being rigidly fixed at their periphery onto the side 15 of the opening 16 in the pump casing or body. In order to be driven in rotation, the rotor 4 requires to be subjected to a rotating magnetic field produced by a stator suitable for induction motors.

The stator 20 for the electric motor, which is shown separately in the right hand portion of FIG. 2 is composed of a stack 31 of thin laminations into which longitudinal slots 32 are formed for receiving the substantially rectilinear and active portions 33 of the turns of the stator windings. The winding overhang or end winding parts 34 which extend outside of the magnetic circuit 31 are housed, at the time of fitting the windings into the magnetic circuit, between two sleeves portions 35 and 36, at one side of the magnetic circuit, and at respectively 37 and 38 at the other side of the magnetic circuit (at the side directed away from pump rotor 2). The inner sleeve portions 36 and 38, which for example are integral with a slot insulation 39 (see the upper part of FIG. 1), are molded over at the region of the air gap and of the passages leading to the slots that they extend laterally, while the outer sleeve portions 35 and 37 form an extension of a yoke ring 40 that forms the outer housing of the magnetic circuit of stator 31.

After the windings have been fitted followed by their optional compounding with a hardening insulating product, the end winding parts 34 are encapsulated at each side in a closed insulating housing. At the pump rotor 2 side, this insulating housing is made up by the pairs of insulating sleeve portions 35 and 36 closed off at their end by a forward insulating capping plate 41 that is open over the whole cross-section of the air gap in order to receive the air gap tube 9. At the rear end, in other words the end remote from the pump rotor 2, this insulating housing is made up by the insulating sleeve portions 37 and 38 closed off at their ends by a rear capping plate 42 that includes a flange 43 for indirectly supporting the stator 20 on the rear rotor bearing 7. The abutment of this flange 43 is in fact achieved by a hollow cylindrical part or bore 50 that bears on the outer cylindrical side and the forward front side of the elastomer cover member 22 covering the sleeve portion 10 and retained by the annular lip 21 of the plug or closing member 12.

The outer frame or casing 40 in an insulating material of the yoke 31a of magnetic circuit 31 (the magnetic circuit 31 is considered as made up by a slot portion 31b and a yoke portion 31a which are radially united) here carries a terminal box 44 formed as an integral part thereof for the connection to the power supply for the stator. A capacitor 45 can be housed in the terminal box 44 and connected to the stator auxiliary phase when a single phase electrical supply network is used. The path for the connecting wires between the connection box 44 and the end winding parts 34 is provided in holes 46 formed in the sleeve portion 37 that constitutes the rear housing for the winding overhang or end winding parts. In the conventional fashion, terminal box 44 carries connecting terminals or lugs or clamping plates for the electrical wires 47, but may also include speed regulation terminals or pins 48.

Assembly of the stator 20 onto the rotor block illustrated at the left side of FIG. 2 is carried out by simply slipping it over the air gap tube 9. The conical lead-in portion 41a of the front capping plate 41 enables said plate to be correctly centered on the air gap tube 9 as well as enabling the stator air gap passage 27 to be brought right opposite rotor 4 and to the immediate proximity of the outer surface of the air gap tube 9 with which it may come into contact at several points. At this axial alignment position of the stator and rotor air gap surfaces and, consequently, of the stator and rotor magnetic circuits, the outer sleeve portion 35 comes into frictional engagement with the annular elastomer layer 19 provided at the inside of retaining ring 18. Contact between the sleeve portion 35 and the elastomer layer 19 simultaneously achieves two functions: firstly, sealing at the front face 15 of the pump body supplemented if appropriate by an annular gasket 49 and secondly, frictional holding in position thereof on the retaining ring 18 integral with body 1. It will be noted that the stator 20 can be freely oriented in rotation with respect to pump body 1 prior to being engaged by its sleeve portion 35 inside the retaining ring 18.

In accordance with a further aspect of the invention, the stator 20 which comes to bear, via this forward outer sleeve portion 35 on the retaining ring 18 and via its air gap surface 27 on the air gap tube 9, also bears on the elastomer cover member 22 via the hollow cylindrical part or bore 50 that ensures rear centering of the stator 20 with respect to the air gap tube 9. By providing a relatively thick layer of elastomer under the annular lip 21, it would be possible to ensure retention of the rear capping plate 42 by the cover member 22 by providing for aligned mounting of the passage of this cover onto the cover member 22 in elastomer material. Indeed, as a result of compressing the cover member 22 onto the lip 21, the compressed elastomer behaves like a hydrostatic fluid and swells radially thus blocking the rear capping plate 42 in position by friction while still retaining, as a result of the elastomer's considerable elasticity, the possibility of shifting position while ensuring vibration damping.

In order to maintain the stator in position axially, provision can also be made for the lip 21 of the plug or closing member 12 to abut against a matching flange or lip of the rear capping plate 42. The two capping plates of the housings providing encapsulation of the end winding portions preferably fit accurately onto cylindrical supporting surfaces of the said sleeve portions and can be bonded in place when an accurate fit is achieved in order to prevent any separation and to achieve the result that the whole of a stator 20 behaves like one inseparable block. When no air gap tube is employed, the forward capping plate 41 can include a flange allowing the stator 20 to be screw-fitted onto the pump body 1 together with centering thereof with respect to rotor 4.

Figure 3:
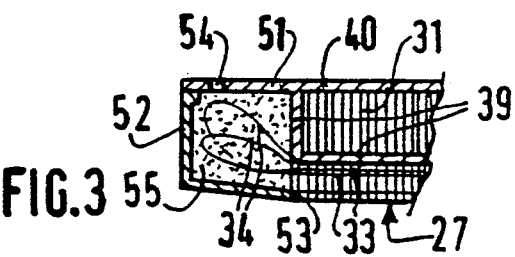
FIG. 3 shows a partial view in longitudinal cross-section of another embodiment of the stator according to the invention.

An alternative of an end winding portion housing is shown in FIG. 3 where only one single outer sleeve portion 51 is used which is of one-piece construction with the molded-over insulation layer 39 of the slot insulator which also covers the ends of magnetic circuit 31. The housing structure is closed off by an end cap or cover 52 which abuts against the end of the sleeve portion 51 and against an annular region 53 of the lateral face of the magnetic circuit in the region where the air gap surface terminates, in other words where the laminations widen out in order to cover the major portion of the air gap surface. As the annular region 53 is generally covered by a molded over insulation layer 39 in an electrically insulating plastics material that is suitable for bonding or welding, the end cover 52 is bonded or welded, notably using ultrasonic welding which is particularly appropriate for the electrically insulating plastics material, to respectively, sleeve portion 51 and the slot insulating layer in the annular region 53, thus enclosing the end winding parts or overhang 34. The free spaces left between the winding end parts 34 and the housing structure can be compound-filled via an opening 54 provided for example in the sleeve portion 51 using a hardening compounding product 55 which firmly locks the winding end parts 34 in position in the said housing structure.

The housing structures which encapsulate the end winding parts can be produced independently of any sleeve that surrounds said winding end parts and can come into direct abutment with the yoke of the magnetic circuit of the stator, but, in every case, they must provide an axial entrance for sliding the rotor into the stator or rather, as shown in FIGS. 1 and 2, to allow axial introduction, or extraction, of the stator around the rotor. The stator 20 is connected to the electrical supply and regulating circuit by any suitable means including those shown in FIG. 1 and can notably be already connected to power supply leads at the time it is mounted onto the rotor and rotationally oriented prior to becoming locked in position onto a support common to the rotor and to the stator such as pump body 1. The electrical circuits can equally as well be set up after the stator is fitted just like in a conventional electric motor.

The invention is not limited to the embodiments shown and described herein; many alternatives and modifications may be envisaged by those skilled in the art without departing from the spirit and scope of the invention as defined in the appended claims.

What is claimed is:

1. An electric motor assembly for driving a pump having a rotor and pump rotor housing, comprising:
   a) an electric induction motor rotor sealingly mounted in cantilevered fashion inside an air gap sleeve on the pump rotor housing and including a front bearing that is common to the rotor of said electric motor and the rotor of said pump, and a rear bearing supported on the air gap sleeve; and
   b) a stator encapsulated in an insulating envelope closed at the stator's magnetic circuit yoke and at the winding turns thereof right up to the end portion of the laminations at the entrance to the air gap of the stator and open over the whole of the cross-section of the air gap in order to receive the rotor and the air gap sleeve in which it is mounted, the magnetic circuit of the stator being covered with a molded-over insulating layer, said layer including at each of the stator end faces two sleeve portions that are concentric with the air gap and surround the overhang winding parts of the stator and an insulating end cover rigidly and sealingly secured by bonding onto said sleeve portions in order to enclose said overhang winding parts, a hardening compound at each stator end engaging and holding the overhang winding parts in a fixed position;
   c) the whole stator with its embedded windings being inserted over the air gap tube in a removable manner by means of first and second insulating end covers said first insulating end cover being connected at one end of the motor stator to the respective sleeve portions and engaging against said pump rotor housing and said second insulating end cover being connected at the other end of the motor stator with the respective sleeve portions and abutting on a rear rotor bearing support that is integral with said air gap sleeve.

2. An electric motor assembly according to claim 1 wherein the second insulating end cover abuts on said rear rotor bearing support by means of an annular sealing gasket while said first insulating end cover is mounted in a sealing manner onto the pump rotor housing whereby the stator circuit is sealingly separated from the outside atmosphere.

3. An electric motor assembly according to claim 2 wherein a removable plug of the electric motor shaft rear chamber communicating with the pump fluid circulation circuit is screwed onto said rear rotor bearing support and sealingly abuts against said annular sealing gasket sealingly receiving said second insulating end cover on said bearing support.

4. An electric motor assembly according to claim 1 wherein the outermost sleeve portion of said first insulating end cover is frictionally engaged with an annular elastomer layer provided inside a retaining ring integral with said pump housing whereby a sealing joint is established at the front side of said pump housing and said stator which, prior to its engagement onto said pump housing can be freely rotationally oriented, is frictionally maintained in position on said pump housing.

5. An electric motor assembly according to claim 1, wherein at least one of said sleeve portions has wires passing therethrough for connecting the windings of the motor to an external source of electrical power, and is joined to an insulating yoke ring externally surrounding the magnetic circuit yoke and carries a terminal box for connection to the electrical supply network.

* * * * *